United States Patent [19]

Slangan et al.

[11] 4,233,325

[45] Nov. 11, 1980

[54] ICE CREAM PACKAGE INCLUDING COMPARTMENT FOR HEATING SYRUP

[75] Inventors: Gary Slangan, Fuchu; Masaaki Tsunashima, Fujisawa, both of Japan

[73] Assignee: International Flavors & Fragrances Inc., New York, N.Y.

[21] Appl. No.: 75,028

[22] Filed: Sep. 13, 1979

[51] Int. Cl.³ .................. B65D 85/78; B65D 25/08; B65B 29/08; B65B 25/22

[52] U.S. Cl. .................... 426/107; 206/219; 219/10.55 E; 426/110; 426/113; 426/115; 426/120; 426/124; 426/130; 426/234; 426/393

[58] Field of Search ............. 426/107, 234, 243, 115, 426/112, 120, 86, 124, 110, 113, 130, 393; 219/10.55 E; 206/219

[56] References Cited

U.S. PATENT DOCUMENTS

| | | | |
|---|---|---|---|
| 2,287,610 | 6/1942 | Guidry | 426/124 |
| 2,600,566 | 6/1952 | Moffett | 426/234 |
| 2,604,976 | 7/1952 | Sarg | 426/120 |
| 2,714,070 | 7/1955 | Welch | 426/234 |
| 3,219,460 | 11/1965 | Brown | 426/234 |
| 3,240,610 | 3/1966 | Cease | 426/120 X |
| 3,305,368 | 2/1967 | Bourelle | 426/115 |
| 3,326,363 | 6/1967 | Bennett et al. | 426/115 |
| 3,385,503 | 5/1968 | Stump | 426/120 X |
| 3,547,661 | 12/1970 | Stevenson | 426/243 |
| 3,615,713 | 10/1971 | Stevenson | 426/234 |
| 3,743,520 | 7/1973 | Croner | 426/115 |
| 3,779,372 | 12/1973 | Lloret | 426/115 |
| 4,133,896 | 1/1979 | Standing et al. | 426/234 |
| 4,166,208 | 8/1979 | Martel | 426/243 X |

FOREIGN PATENT DOCUMENTS

| | | | |
|---|---|---|---|
| 1110776 | 4/1968 | United Kingdom | 426/107 |
| 1451094 | 9/1976 | United Kingdom | 426/115 |

*Primary Examiner*—Steven L. Weinstein
*Attorney, Agent, or Firm*—Arthur L. Liberman

[57] ABSTRACT

A two-compartment package is provided which includes in a first lower compartment, frozen or refrigerated ice cream; and in a second upper compartment, frozen or refrigerated syrup with the frozen or refrigerated syrup being supported on a microwave reflective material and the microwave reflective material protecting the frozen or refrigerated ice cream from microwave energy whereby the rate at which the frozen ice cream located in the first lower compartment absorbs heat is much less than the rate at which the syrup in the second upper compartment absorbs heat. The first and second compartments are enclosed in a sealed container, the top surface of the second compartment of which is transparent to microwave energy.

The second upper compartment may be an integral part of the food package or it may be a separate container means that is removably and tightly fitted within the upper portion of the first lower compartment.

9 Claims, 18 Drawing Figures

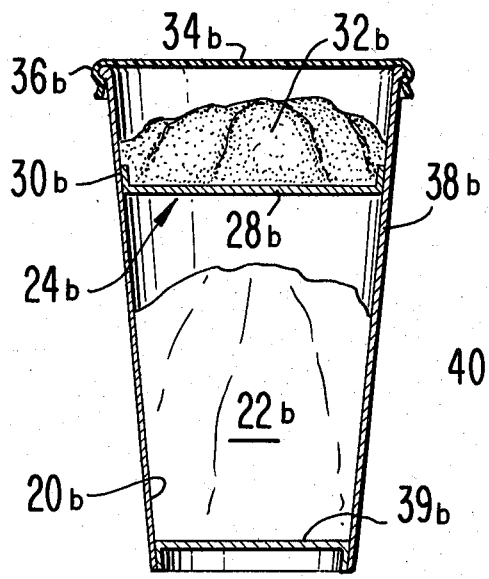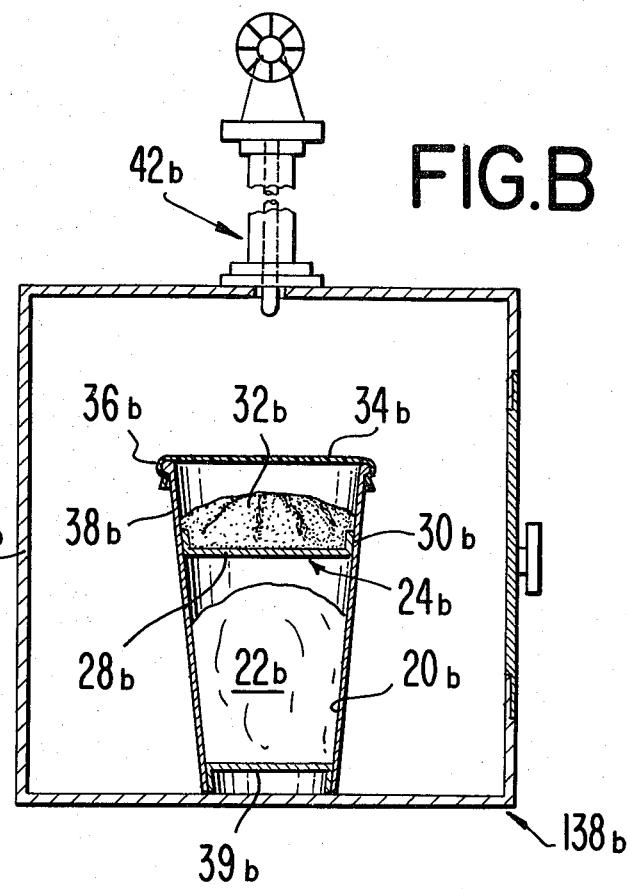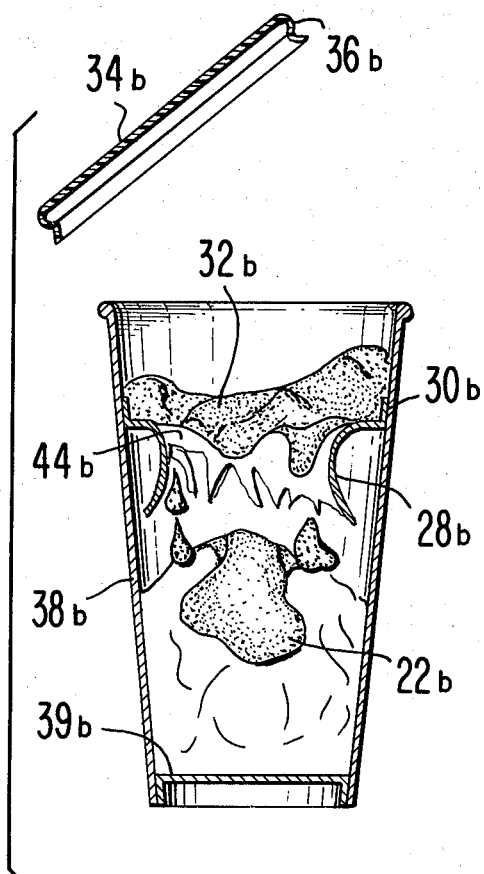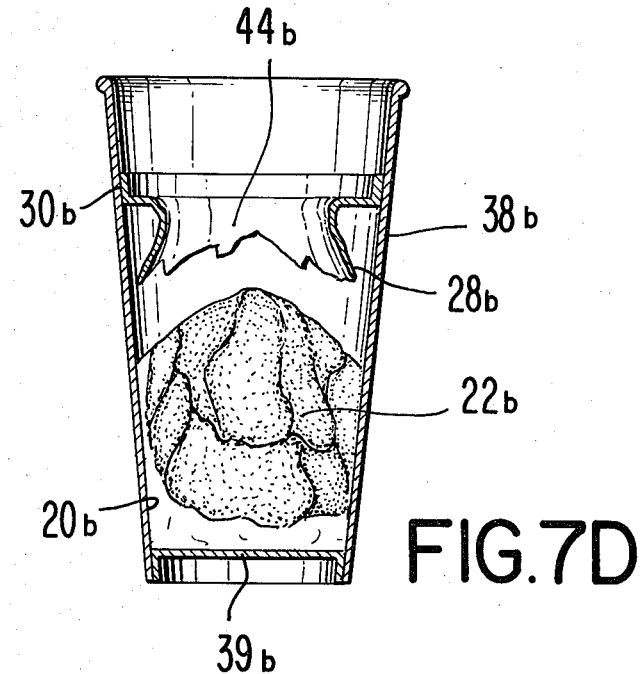

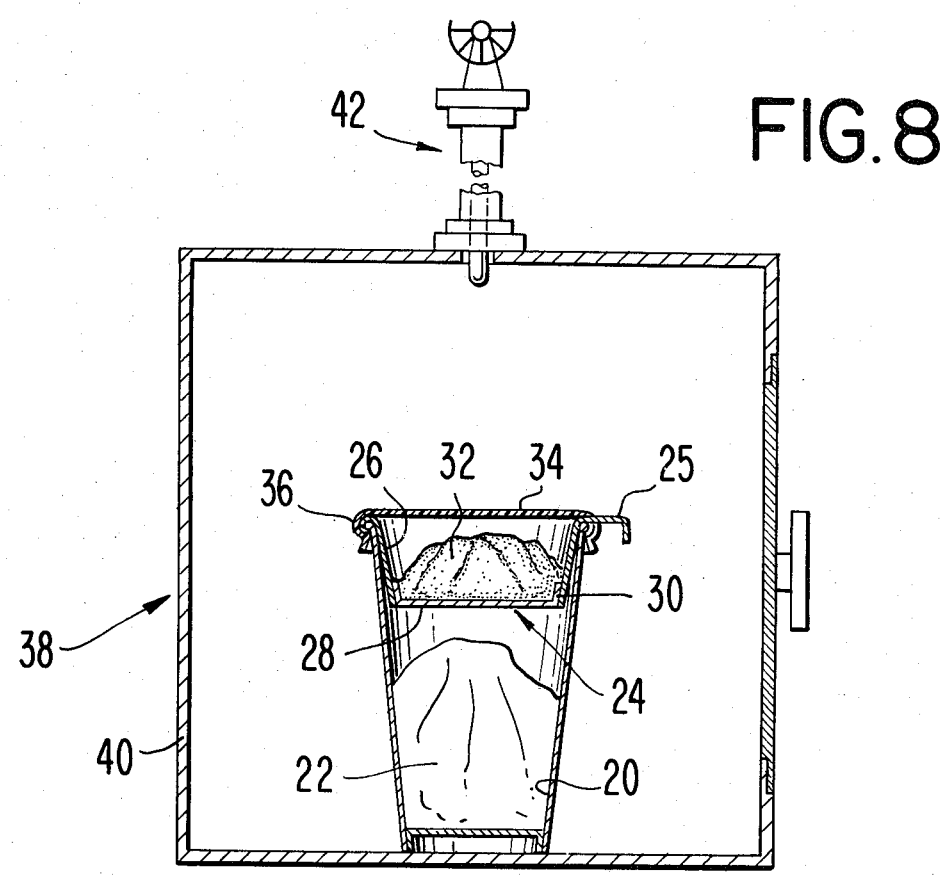
FIG. 8
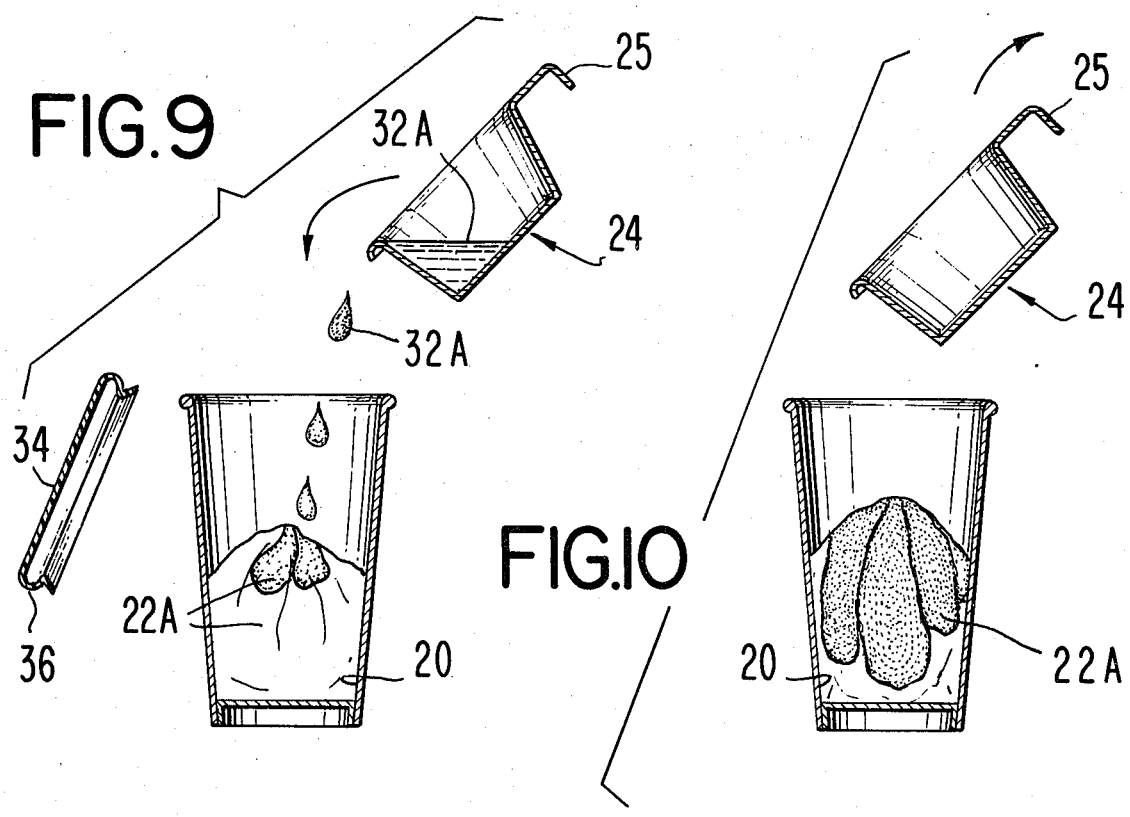
FIG. 9
FIG. 10

ICE CREAM PACKAGE INCLUDING COMPARTMENT FOR HEATING SYRUP

FIELD OF THE INVENTION

The present invention relates to food packages and more particularly to two-compartment frozen ice cream/frozen syrup packages designed to facilitate (a) the heating of the frozen syrup to serving temperature and simultaneously maintaining of the ice cream in a frozen state and (b) the pouring of the ready-to-serve syrup onto the frozen ice cream while maintaining the integrity of the food package.

THE PRIOR ART

U.S. Pat. No. 2,600,566 discloses a method which consists in dielectrically heating a food package which may contain ice cream and a syrup therefor by means of high frequency alternating current and controlling the heating effect by an electrically conductive shield positioned in proximity to a portion of the food package and acting to prevent access of the high frequency waves to portions of the package and to cause the high frequency waves to reach and heat some portions of the package to a greater degree than other portions thereof. More specifically, U.S. Pat. No. 2,600,566 affords a frozen food package, such as an ice cream package to a heating process whereby a body of ice cream or frozen dessert and a body of topping or syrup adapted to be liquidified upon heating is separated by an edible or other insulating barrier or layer, as for instance, a cake-like layer positioned between the ice cream and body of topping material or by an edible or other container adapted to receive the syrup or topping material and embedded in the ice cream, the cake-like layer or container acting to keep the syrup or topping hot until consumed or for at least ten to fifteen minutes. The method of heating frozen food packages of U.S. Pat. No. 2,600,566 does not, however, afford itself to the use of fast efficient microwave heating.

U.S. Pat. No. 4,133,896 issued on Jan. 9, 1979 discloses a food package for storing and heating foods to serving temperature from a frozen or refrigerated state in both microwave and conventional ovens comprising (i) at least one food body comprising bread; (ii) a condiment container means resting on said food body, said condiment container means being inverted and having a bottom and side wall and a mouth facing downwardly; said condiment container means being formed from sheet material; (iii) a condiment adhered to the bottom wall of said condiment container means in spaced relationship above the food body whereby moisture migration is prevented from the condiment to the said food body when the condiment is thus adhered to the bottom wall of the condiment container means; (iv) a microwave reflective metallic sheet element enclosing at least a part of the condiment container means opposite the mouth to reduce the rate at which the condiment absorbs heat and said condiment being heat releaseable from the condiment container means during heating in the oven and being free to fall to the mouth of the condiment container means on to the food body comprising bread where microwave energy can be absorbed at a faster rate whereby the exposure of the condiment to microwave energy is initially limited thereby preventing overheating of the condiment during the initial heating of the bread and (v) a microwave transparent container enclosing said food body and said condiment container means. The package and process of U.S. Pat. No. 4,133,896 are not, however, adapted to the microwave heating of a two-compartment container whereby a frozen syrup will be altered into a liquified room temperature form or even a "hot" liquid form without the corresponding increase in temperature of ice cream in a second compartment which remains in a solid, "supercooled" state.

U.S. Pat. No. 2,200,977 (issued May 14, 1940) discloses a frozen food product comprising a layer of frozen cream; a biscuit of grain-like crunchy cereal pieces having a frozen coating of cream thereon supported upon said layer of frozen cream; and a portion of ice cream on the cream coated biscuit whereby when the product is exposed to non-freezing temperature in a suitable container immediately prior to use, the then thawed cream-wet mass of food product becomes partially submerged in a pool of cream.

U.S. Pat. No. 2,714,070 discloses a microwave heating apparatus and method of heating a food package wherein at column 2, lines 5–17 it is indicated that there is provided apparatus whereby a frozen food body which is stored in a dielectric container may have the edges thereof which contact said dielectric container heated sufficiently to loosen the bond between said dielectric container and the food body whereby the dielectric container covering the food body may be withdrawn from the food body thereby exposing said food body for eating purposes and, in addition, a metallic shield member may be placed over portions of the dielectric member to prevent overheating of a particular portion of the food body due to its energy absorption characteristic during the bond loosening process.

U.S. Pat. No. 2,714,070 also indicates at column 2, lines 53–60 that the dielectric container may be a paper or plastic tray which is divided into a plurality of compartments as by indentations whereby various types of food bodies may be positioned and whereby as a result of use of a shield microwave energy can penetrate the food body only from the top thereof through a paper member.

U.S. Pat. No. 3,743,520 discloses a compartmented beverage container which has on the underside portion of a can top one or more ruptureable compartments. The compartments each contain a different ingredient for modifying a basic beverage in the container. The top of the can is marked to indicate the location and content of each compartment and where rupturing of the top provides access only to the basic beverage. The bottom wall of the compartment may be positioned such that rupturing of the top of the beverage can over the compartment with an ordinary can opener will also rupture the bottom of the underlying compartment to allow entry of the modifying ingredient into the beverage in the can. The bottom of the compartment may be positioned so as not to be ruptured by a can opener providing access to the modifying ingredient through the top of the can. The application of microwave energy in this multi-compartment beverage container system is not disclosed however.

U.S. Pat. No. 2,759,830 issued on Aug. 21, 1956 discloses a metallic foil food cooking wrapper and method for making same for use in cooking food by means of radiant heat having particular reference to a composite sheet of aluminum treated on one surface with an infrared absorbent dye or treated so as to provide an infrared absorbent surface and treated on the other surface with a flavor intensifying agent whereby the food product when wrapped therein against said flavor treated surface, upon being exposed to such heat, rapidly will be cooked and said flavor will be driven therein.

U.S. Pat. No. 2,864,932 issued on Dec. 16, 1958 discloses an infrared cooking oven and adapted for use in such infrared cooking oven is a food which is exposed from opposite sides to infrared radiation which is of substantially equal cooking intensity from the opposing sides. While so exposed to infrared radiation, the food is surrounded by an ambient atmosphere which is in sufficiently rapid circulation so that the atmosphere as such is not at food cooking temperatures, However, this food in the claimed oven is protected from dehydration by the rapidly circulating ambient atmosphere by reason of the fact that it is desirably completely enclosed and sealed within a heat transparent protective wrapper. Thus, the food cooked substantially exclusively by infrared radiation is so cooked without loss of moisture or natural juice content and is disclosed to be cooked substantially uniformly throughout all portions of the food.

U.S. Pat. No. 2,902,371 issued on Sept. 1, 1959 discloses a cooking wrapper for enclosing an article of food including a metallic foil sheet, a food-basting film on the side of the sheet adjacent an enclosed article of food, the film being composed of a shortening material which is pliable at room temperature and which has a melting point of above 140° F. whereby the shortening material melts and bastes an article of food at cooking temperature.

U.S. Pat. No. 3,042,532 discloses a method and apparatus for seasoning foods during the cooking thereof consisting in initially providing a wrapper of normally impervious material provided with a plurality of recesses formed therein, filling the recesses before wrapping the food therein with seasoning material of a type to spread over the surface of the foods being cooked when said wrapper is wrapped there around, wrapping the food to be cooked with said wrapper sheet containing the seasoning material, and cooking the food with the wrapper and seasoning material there around to retain a substantial portion of the juices of the food within the wrapper while constantly basting the surface of the food being cooked with the seasoning material carried by the recesses of the wrapper. The concept of the instant invention pertaining to melting syrup while permitting ice cream to be retained in its frozen form is not taught nor is it inferred by the above prior art.

U.S. Pat. No. 3,539,354 discloses a frozen package which comprises a container for a sandwich in which bread slices of the sandwich are held in intimate flatwise contact with metallic surfaces of the container and a lid therefor, so that said metallic surfaces will grill the sandwich during a single oven heating period acting primarily to thaw the frozen sandwich and warm it to a desirable eating condition. This method of preparation is alleged to constitute a single step convenient procedure which eliminates repeated handling of the package and its contents with a minimum expenditure of time, effort and preparation. The concept of keeping ice cream cold in one part of the container while heating syrup either to room temperature or to form a "hot syrup" in another portion of the container is not taught nor is it inferred in said U.S. Pat. No. 3,539,354.

U.S. Pat. No. 3,305,368 issued on Feb. 21, 1967 discloses a multi-compartment beverage package which is a sealed, compartment beverage container having a side wall, a bottom wall and a continuous top wall having its periphery crimped over the top edge of said side wall in a fixed engagement and extending in planar relationship between said crimped periphery and a readily rupturable compartment wall member underlying said top wall generally coextensive therewith and dividing the interior of said container into an upper compartment thereabove containing acid-sensitive syrup and a lower compartment therebelow containing carbonated water, said compartment wall member providing a substantially gas and moisture impermeable seal for the syrup therein and isolating the syrup from the carbonated water, said compartment wall member having a bottom wall portion and a side wall portion extending upwardly from said bottom wall portion and sealingly engaged at its upper end with said top wall to define said upper compartment, said bottom wall portion being spaced from said top wall a distance less than the length of the blade of a common can opener so as to be rupturable during puncturing of said top wall by a common can opener engaged with the crimper periphery of said top wall portion to permit the syrup to flow into and mix with the carbonated water. The beverage package of U.S. Pat. No. 3,305,368 is not disclosed to be adaptable for use in a microwave oven nor is it disclosed to be adaptable for use in conjunction with heated syrup or syrup heated to room temperature in the upper compartment and ice cream in the lower compartment which is to be kept in a frozen state.

U.S. Pat. No. 3,623,892 discloses a method of preparing a frozen fowl product comprising (i) eviscerating a fowl; (ii) inserting a tubular member at least partially into the body cavity through the posterior opening thereof; (iii) placing a bag of giblets and/or a neck within said tubular member and (iv) thereafter freezing said fowl. When the fowl is ready for cooking, ready access to the body cavity without the necessity of defroasting is achieved. In addition, the fowl may be cooked without thawing. However, the disclosure of U.S. Pat. No. 3,623,892 does not cover the concept of our invention concerning the thawing and hot melting of syrup while simultaneously maintaining ice cream in a separate compartment container in a frozen state.

U.S. Pat. No. 3,830,944 issued on Aug. 20, 1974 discloses a package of a precooked and frozen sandwich which is formed with an outer foil envelope of a high melting point of plastic suitable for immersion in boiling water surrounding the sandwich ingredients. The sandwich which is encased in the package with the meat portion bearing against at least one side of the surrounding envelope and the bread portions of the sandwich disposed in successive layers thereon. The package automatically rights its position when placed in water to immerse the meat side into the water for thorough heating of the meat while the bread portions are heated by internal steam generated from the meat and sauce components. A preferred embodiment of U.S. Pat. No. 3,830,944 comprises a hamburger while the meat patty bears against the inside surface of the plastic envelope and the package contains, in successive layers, a meat sauce, a bread-sealing cheese sauce, one of the halves of a hamburger bun and the remaining half of the bun. The concept disclosed in U.S. Pat. No. 3,830,944 is unlike that of our invention wherein ice cream is permitted to remain in a frozen state in one portion of the container while syrup which is to be poured on said ice cream is heated in another section of the same container in a microwave oven.

U.S. Pat. No. 3,881,023 issued on Apr. 29, 1975 discloses a flexible cooking container having powder distributed over its interior surfaces. Thus, described therein is a flexible cooking container treated so as to minimize the danger of eruptions during cooking of food therein. Before the food to be cooked is introduced into the container, a small quantity of an edible powder is distributed over the container's interior surfaces. More specifically, the invention of U.S. Pat. No. 3,881,023 relates to cooking of articles of food in bags and sleeves of heat resistant flexible materials, such as heat stabilized type 66 NYLON and aluminum foil. Such bags and sleeves are marketed for consumer use in oven cooking at temperatures from about 325° F. to about 425° F. The bags and the sleeves are used in the same manner, the only difference being that during cooking, both ends of the sleeve are closed with a device, such as a wire twist tie while only one end of a bag must be closed. The concept of our invention concerning the maintenance of ice cream at a frozen state in the same package as syrup is put into a melted state for pouring on the ice cream is not disclosed or inferred in U.S. Pat. No. 3,881,023.

U.S. Pat. No. 3,924,009 issued on Dec. 2, 1975 discloses a food product that is made of noodle mixture and which is formed into cup cake shaped shells that are then filled with various sorts of fillings and which are then packaged with at least several different filled ones in a same package so that a purchaser can selectively choose one or another thereof for being eaten whenever wanted. The concept of the instant invention, however, is not disclosed in U.S. Pat. No. 3,924,009.

BRIEF DESCRIPTION OF THE DRAWINGS

FIG. 7A is a cut away side elevation view of the food package of our invention wherein frozen syrup is contained in the upper compartment and is supported on a microwave-resistant surface which is an integral part of the food package and which is bonded to the vertical side walls of said food package.

FIG. 7B is a cut away side elevation view of the food package of our invention as illustrated in FIG. 7A during heating in a microwave oven.

FIG. 7C is a cut away side elevation view of the food package of our invention as illustrated in FIG. 7A after removal from heating in a microwave oven and after creation of an orifice (as by piercing) in the microwave shield-retaining wall so that the melted syrup or hot syrup can flow from the upper compartment into the lower compartment in which frozen ice cream is contained.

FIG. 7D is a side elevation view of the food package of our invention as illustrated in FIG. 7A after all of the syrup has flowed from the upper compartment to the lower compartment containing the frozen ice cream.

FIG. 8 is a cut away side elevation view of the food package of our invention as illustrated in FIG. 3 during heating in a microwave oven where the upper compartment of the food package of our invention has a handle means or lip (which is an integral part of the side walls thereof) for ease in removal thereof after heating with microwaves.

FIG. 9 is a cut away side elevation view of the food package of our invention as illustrated in FIG. 3 after removal from the microwave oven after heating showing syrup being poured from the upper compartment of our invention onto the frozen ice cream in the lower compartment of the food package of our invention with the upper compartment having a handle means or lip thereon for ease in handling.

FIG. 10 is a cut away side elevation view of the food package of our invention as illustrated in FIG. 3 after all of the syrup is poured from the upper compartment of the food package of our invention onto the frozen ice cream located in the lower compartment of the food package of our invention wherein the upper compartment has a handle means or lip as an integral part of the side walls thereof for ease in separation of the upper compartment from the lower compartment after heating in the microwave oven.

BRIEF DESCRIPTION OF THE INVENTION

It is an object of the present invention to provide a compartmentalized ice cream sundae container wherein:
1. direct access to the ice cream through a molten syrup layer is provided by creation of an orifice in the microwave resistant layer (and, if desired, also separating the first compartment from the second compartment in a specific aspect of our invention);
2. microwave heating of a frozen syrup composition of matter whereby its physical state undergoes a phase change from non-flowable to flowable liquid without simultaneous melting of the ice cream in the adjacent compartment of the container is provided.

It is another object of this invention to provide a food package which is suitable for heating frozen syrup contained therein into a molten state or into a hot syrup from the frozen state as well as from refrigerated storage while simultaneously keeping the ice cream also contained in the same food package is a frozen edible aesthetically pleasing state.

Briefly, a package is provided for producing a syrup-/ice cream combination otherwise known as a "Sundae" substantially instantaneously by placing a two-compartment package in a microwave oven and operating the microwave oven for a brief period of time whereby in an upper compartment the syrup melts or is even heated above the temperature of its melting point while at the same time leaving the ice cream located in the lower compartment in a solid or frozen or refrigerated state. In order to effect the union of the syrup and the frozen ice cream, an orifice is created in the base of the upper compartment where the syrup is stored (as by piercing) or, in the alternative, the upper compartment where the syrup is stored is so designed that it may be lifted in an upward direction away from said lower compartment by the user and the syrup is poured from the upper compartment onto the frozen ice cream located in the lower compartment. The base of the upper compartment where the frozen syrup is stored prior to heating is resistant to the passage of microwave energy therethrough. In addition, if desired, the entire lower portion of the food package containing the frozen ice cream can be fabricated using material resistant to the passage of microwave energy therethrough.

The plane of the microwave resistant material is substantially parallel to the plane of the bottom portion of the lower compartment as well as a microwave-permeable lid which is retained on the upper edge of the food package for sanitary reasons in order to prevent contamination.

An important aspect of this invention is that from the point of completion of manufacture of the food package of our invention until the point of consumation of the contents thereof after removal from the microwave oven, the food package of our invention is not opened or subjected to potential atmospheric contamination or environmental contamination.

DESCRIPTION OF A PREFERRED EMBODIMENT

Figure 1:
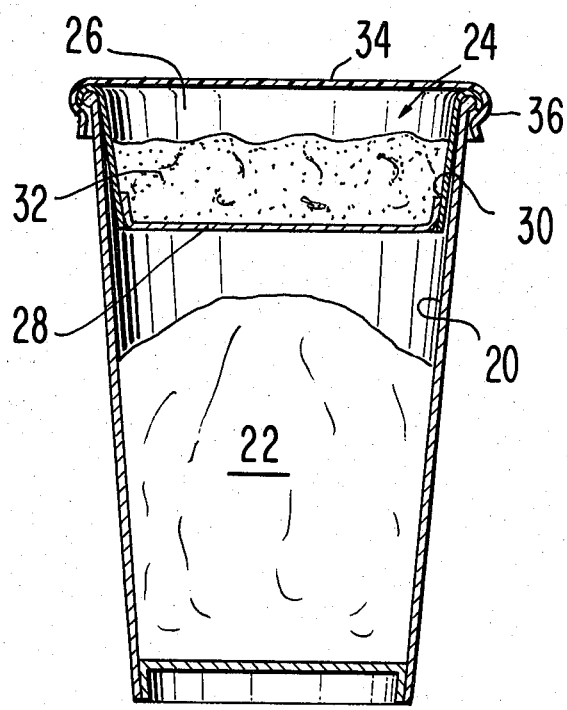
FIG. 1 is a cut away side elevation view of the food package of our invention wherein frozen syrup is contained in the upper compartment and frozen ice cream is contained in the lower compartment.

As is seen in FIG. 1 prior to placement in a microwave oven, the food package exists in two-compartments; an upper compartment 24 holding refrigerated or frozen syrup 32 and a lower compartment 20 holding ice cream 22. The upper compartment may be fabricated of a wall constructed of cardboard 26 and a base 28 fabricated from a microwave-resistant material, such as aluminum foil. The base 28 is attached to the wall of compartment 24 at 30. Covering compartment 24 is a transparent cover 34, for sanitary purposes (in order to prevent contamination of the syrup prior to consumation thereof) having a circular retaining lip 36 (the purpose of which is to keep cover 34 from parting from said food package prior to the desired time of consumation of the contents of the food package) which cover 34 is removed subsequent to melting and heating of the syrup 32 using microwave energy. This cover 34 can be produced out of any heat-resistant flexible material which will permit the passage of microwave energy therethrough but which will not melt or fuse to the walls of the food package as a result of the package therethrough of said microwave energy. The clear material must, of course, be compatible from an organoleptic standpoint and from the toxicity standpoint with the foodstuff into which it will obviously come in contact and it must be stable from a chemical standpoint whereby chemicals will not diffuse therefrom into the foodstuff with which the plastic comes in contact. Thus, polystyrene and polypropylene as well as polyesters, such as cellulose acetate, are suitable for fabricating the clear plastic cover 34.

Figure 2:
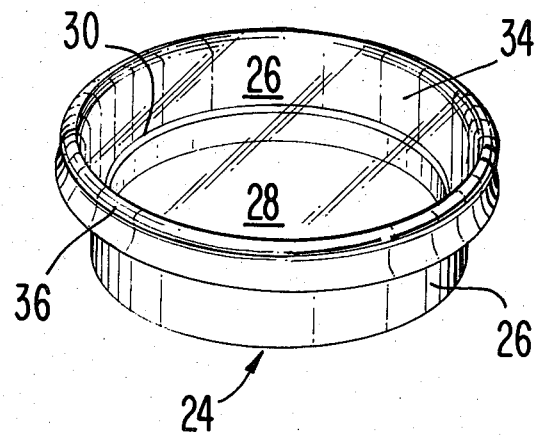
FIG. 2 is a perspective view of the upper compartment of the food package of our invention removed from said food package and covered by a clear plastic shield which has low resistance to the passage of microwaves.

FIG. 2 sets forth in perspective the upper compartment 24 (for use in the food package as illustrated in FIG. 1) having side wall 26 fabricated from cardboard and having microwave-resistant base 28 bonded to side wall 26 at 30 and having clear plastic cover 34 covering the empty container 24; said cover 34 having circular retaining lip 36.

Figure 3:
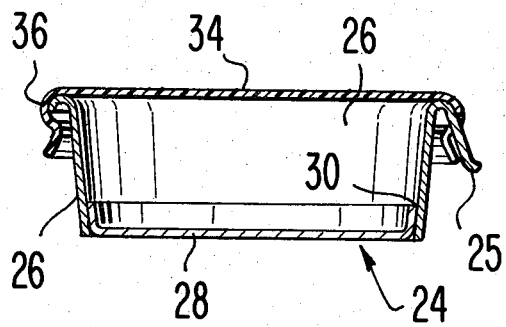
FIG. 3 is a cut away side elevation view of the upper compartment of the food package of our invention, not containing any frozen syrup and as an integral part thereof a handle means or lip for ease in separation of the upper syrup-containing compartment from the lower ice cream-containing compartment of the food package of our invention.

Referring to FIG. 3, the empty upper compartment container for the syrup 24 having side wall 26 fabricated from cardboard and microwave-resistant base 28 for retaining said syrup during heating and for prevention of the passage of microwave energy therethrough also has as an integral part thereof, lip or handle means 25 for easy removal of the upper compartment container 24 from the food package immediately after the syrup 32 is heated so that it could be poured onto ice cream 22 while the ice cream is in a frozen state.

Figure 4:
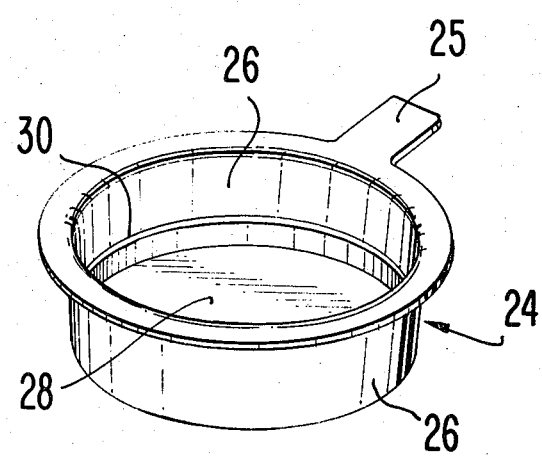
FIG. 4 is a perspective view of the upper compartment of our invention apart from the food package of our invention but bearing a handle means or lip (as an integral part of the side walls thereof) for ease in removal of said upper compartment from the food package of our invention.

FIG. 4 is a perspective view of the upper compartment container 24 (the function of which is to hold syrup 32) having side wall 26 and having as an integral part of said side wall 26 which is fabricated from cardboard, a lip or handle means 25.

Figure 5:
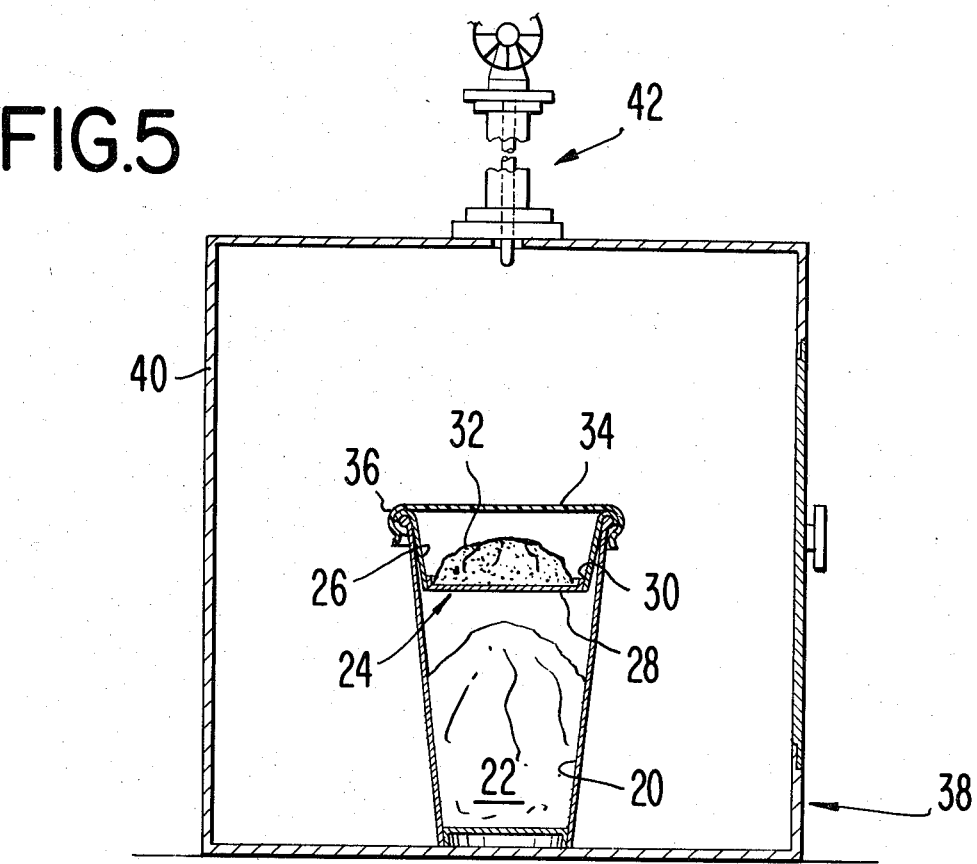
FIG. 5 is a cut away side elevation view of the food package of our invention illustrated in FIG. 1 during heating in a microwave oven.

FIG. 5 illustrates the food package of our invention as illustrated in FIG. 1 contained in microwave oven 38, more specifically, in box 40 wherein microwave source 42 emits energy perpendicular to the surface of clear plastic cover 34 of the food package. The microwave energy passes through clear plastic cover 34 and activates the molecules of refrigerated syrup 32 causing the syrup to heat up, melt and, if desired, become hot. The surface on which syrup 32 is resting, surface 28, is fabricated of such a material that it is substantially resistant to the passage therethrough of the microwave energy. The container 20 for ice cream 22 may, if desired, be fabricated of a material such that microwave energy being reflected from wall 40 will not pass through the walls of container 20 in order to melt or heat up ice cream body 22.

Figure 6:
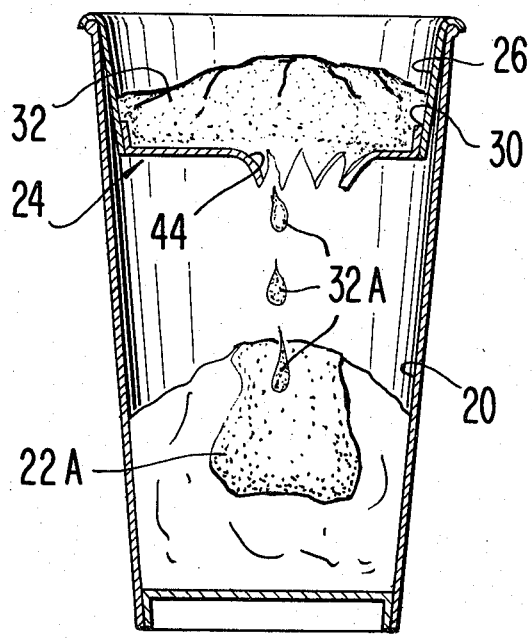
FIG. 6 is a cut away side elevation view of the package of our invention as illustrated in FIG. 1 after removal from heating in a microwave oven and after creation of an orifice (as by piercing) in the microwave shield-retaining wall so that the melted syrup or hot syrup can flow from the upper compartment into the lower compartment in which frozen ice cream is contained.
Figure 7:
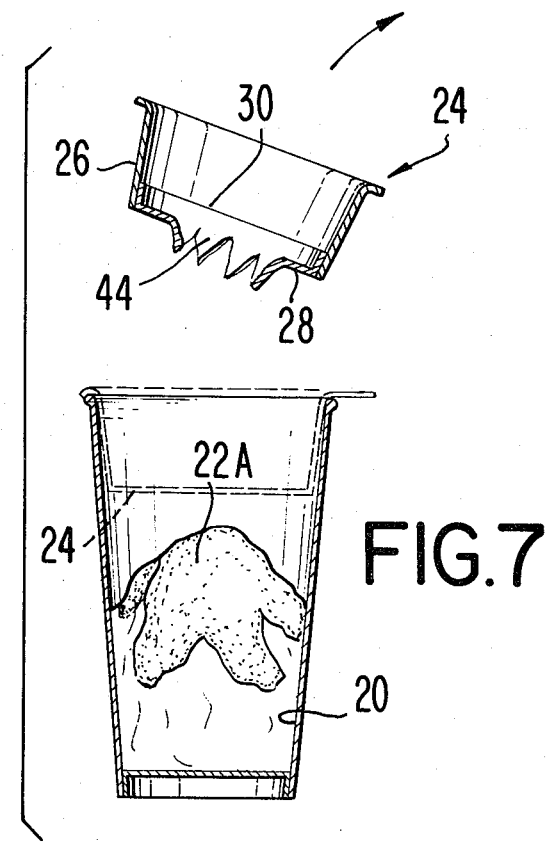
FIG. 7 is a side elevation view of the food package of our invention illustrated in FIG. 1 after all of the syrup has flowed from the upper compartment to the lower compartment containing the frozen ice cream, showing removal of the upper compartment from the food package of our invention.

FIGS. 6 and 7 show the results of utilization of the food package of our invention as illustrated in FIG. 1 immediately after heating of the syrup 32 held in compartment 24. The syrup 32A is permitted to flow through orifice 44 (created by the consumer of the contents of the food package) in surface 28 of container 24 as a result of the puncture of surface 28 and as a result of the flowability of syrup 32 as a result of its being heated in microwave oven 38. The syrup 32A flows easily onto ice cream body 22A which is still in a frozen state since the microwave energy was substantially shielded from ice cream body 22A as a result of the construction of surface 28 which is substantially resistant to the passage therethrough of microwave energy. In FIG. 7, punctured container 24 having opening 44 is shown being removed from the lower compartment 20 which contains the ice cream body 22A and thus, the ice cream body having the hot syrup or melted syrup thereon is ready to be consumed.

As is seen in FIG. 7A, prior to placement in a microwave oven, the food package exists in a unitary container having two compartments; an upper compartment 24b holding refrigerated or frozen syrup 32b and a lower compartment 20b holding ice cream 22b. The food package is fabricated in such a way that a microwave-resistant surface 28b is bonded to side walls 38b at 30b. Microwave-resistant material 28b may be fabricated from a microwave-resistant material, such as aluminum foil. Covering compartment 24b is a transparent cover 34b for sanitary purposes (in order to prevent contamination of the syrup prior to consumation of the ice cream and syrup) having a circular retaining lip 36b (the purpose of which is to keep 34b from parting from said food package prior to the desired time of consumation of the contents of the food package) which cover 34b is removed subsequent to melting and heating of the syrup 32b using microwave energy. This cover can be produced out of any heat-resistant flexible material which will permit passage of microwave energy therethrough but which will not melt or fuse to the walls 38b of the food package as a result of the passage therethrough of said microwave energy. The clear material must, of course, be compatible from organoleptic standpoint and from a toxicity standpoint with the foodstuff into which it will obviously come in contact and it must be stable from a chemical standpoint whereby chemicals will not diffuse therefrom into the foodstuff with which the plastic comes in contact. Thus, polystyrene and polypropylene as well as polyesters, such as cellulose acetate are suitable for fabricating the clear plastic cover 34b. The clear plastic cover 34b is in a plane substantially parallel to the plane of microwave-resistant material 28b. The clear plastic 34b, of course, is microwave-permeable. Side walls 38b surround the base of the food package of our invention 39b on which the ice cream 22b is supported. Base 39b is in a plane substantially parallel to the plane of microwave-resistant material 28b and the plane of the transparent microwave-permeable lid 34b.

FIG. 7B is a cut away side elevation view of the food package as illustrated in FIG. 7A during heating in the microwave oven 138b, more specifically, in box 40b wherein microwave source 42b emits energy perpendicular to the surface of clear plastic cover 34b of the food package. The microwave energy passes through clear plastic cover 34b and activates the molecules of refrigerated syrup 32b causing the syrup to heat up, melt, and, if desired, become hot. The surface on which syrup 32b is resting, surface 28b, is fabricated of such material that it is substantially resistant to the passage therethrough of the microwave energy. Compartment 20b of the food package of our invention in which ice cream 22b is located may, if desired, be coated with a material such that microwave energy being reflected from wall 40b will not pass through the walls of compartment 20b in order to melt or heat up ice cream body 22b.

FIGS. 7C and 7D show the results of utilization of the food package of our invention as illustrated in FIG. 7A immediately after heating of the syrup 32b held in compartment 24b. The syrup 32b is permitted to flow through orifice 44b in surface 28b of compartment 24b as a result of the puncture of surface 28b and as a result of the flowability of syrup 32b as a result of its being heated in the microwave oven 138b. The syrup 32b flows easily onto ice cream body 22b which is still in a frozen state since the microwave energy was substantially shielded from ice cream body 22b as a result of the construction of surface 28b which is substantially resistant to the passage therethrough of microwave energy. FIG. 7D shows the use of the food package of our invention with the contents in a "ready to consume" state.

FIG. 8 shows the use of a variation of the package of our invention as illustrated in FIG. 1 wherein lip or handle means 25 is made an integral part of the cardboard wall 26 of container 24. The food package (containing syrup 32 in container 24 and containing ice cream 22 in container 20) is placed in microwave oven 38 wherein microwave energy source 42 through the clear plastic protective lid 34 into refrigerated or frozen syrup 32 thereby melting it and, if desired, depending upon the length of time of exposure and intensity of exposure, superheating the syrup above its melting point. The microwave energy is resisted by surface 28 so that the microwave energy is not substantially absorbed by ice cream 22 contained in container compartment 20. The food package of our invention is then removed from microwave oven 38 ready for use as illustrated in FIGS. 9 and 10.

Thus, in FIG. 9 the melted syrup from container 24 is poured onto the frozen ice cream 22 contained in compartment 20, the protective clear plastic lid 34 being discarded. The syrup 32a being poured rather than passing through an opening as in FIG. 6 enables the user of the food package to reuse it since surface 28 would not be ruptured or punctured. However, container 24 may be removed from the area of consumption of the contents of the food package thereby enabling the ice cream 22 covered with syrup 32 contained in container compartment 20 to be consumed.

It is also possible to use the apparatus as set forth in Canadian Pat. No. 1,053,331 and United Kingdom Pat. No. 1,506,037 issued on Apr. 24, 1979 wherein a food defrosting technique and apparatus is disclosed whereby food defrosting takes place by conductive and microwave heating in a vertical chamber with food loaded onto recirculating trays. Thus, instead of the unit usage of the ice cream package of our invention by hand placing said ice cream package into microwave oven 38, e.g., box 40, the packages of our invention may be processed using recirculating trays as in a fast food retail outlet.

DIFFERENTIATION OF PRIOR ART FROM INSTANT INVENTION

Figure 11:
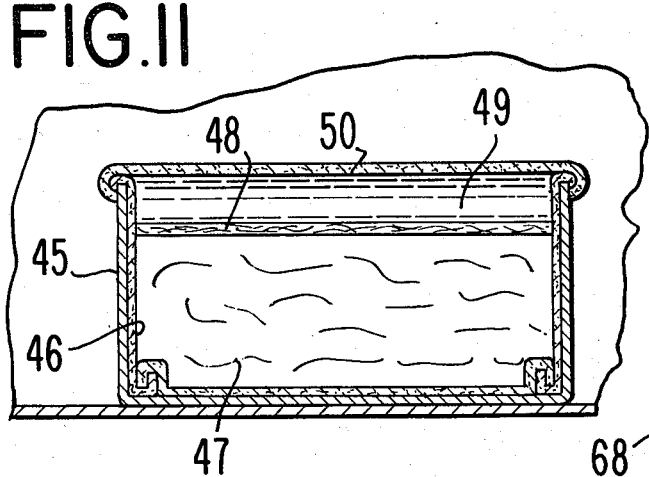
FIG. 11 is an embodiment of the invention of U.S. Pat. No. 2,714,070 showing a longitudinal, cross-sectional view of ice cream and sauce body and a shielding container for preparing said body for eating.

FIG. 11 is a reproduction of FIG. 4 of U.S. Pat. No. 2,714,070 issued July 6, 1955. In said FIG. 4 of U.S. Pat. No. 2,714,070, metallic shield 45 is utilized during the heating operation whereby ice cream is insulated from the heat while at the same time syrup is melted using a heating source. The shield, for example, is a metallic cup. Positioned in shield 45 is a paper cup 46, the lower portion of which is filled with an ice cream body 47. Positioned on top of said ice cream body 47 may be an ice cream cake or cone body 48 and positioned on said body 48 is a layer of sauce 49 which may be, for example, a chocolate or fudge sauce. Covering sauce 49 across the top of paper container 46 is a paper cover 50, the cover 50, cup 46 and its contents being prepackaged by a manufacturer. To prepare the package for eating, the vendor places the package in shield 45 and places the entire assembly in an electronic cooker. Due to the action of shield 45 energy from the cooker can penetrate the food body only from the top thereof through paper member 50. Since the sauce 49 is relatively high loss substance, it will absorb substantially all the microwave energy passing therethrough with the result that little or no microwave energy passes into the ice cream body 47. The ice cream body 47 thus remains frozen and due to ice crystals therein, substantially entirely reflects any energy which does pass through the sauce 49 back into sauce 49. Since the cake member 48 is a relatively good heat insulator, the ice cream body 47 is not melted to any substantial extent by conductive heat from the sauce 49. Upon removal from the electronic cooker, the product is ready for eating upon removal of paper cup 50. The resulting product is an ice cream having a hot fudge sauce which may be eaten directly from the paper container 46 inside the shield member 45. The differentiation between U.S. Pat. No. 2,714,070 and the instant case lies in the fact that the syrup in our own invention 32 is supported on a microwave shield 28 rather than being supported on a cake crust or cone body or other foodstuff which must be eaten with the syrup. Furthermore, the quantity of syrup poured onto ice cream body 22 is controllable since not all of syrup 32 need be utilized.

Figure 12:
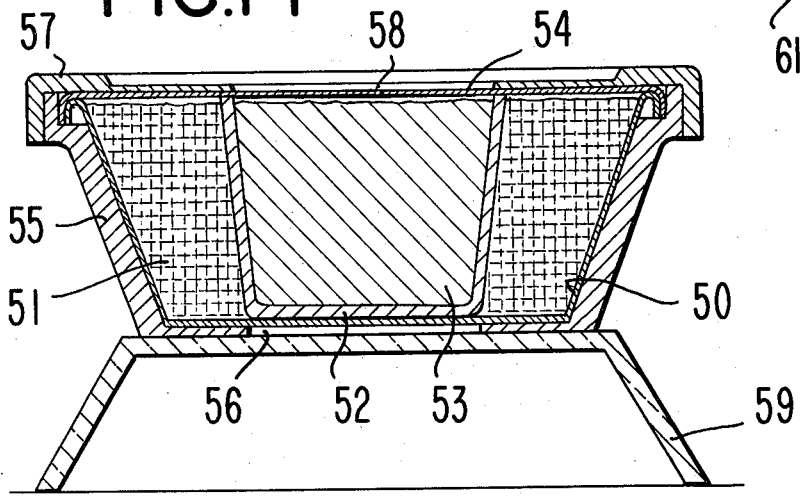
FIG. 12 is a form of frozen food confection with which the invention of U.S. Pat. No. 2,600,566 may be carried out.

FIG. 12 is a reproduction of FIG. 2 of U.S. Pat. No. 2,600,566 issued on June 17, 1952. In this figure, a form of frozen food confection is illustrated in which the paper or cardboard container 50 contains a body of ice cream or other frozen dessert 51 while embedded in the latter is a receptacle 52 of any suitable edible material, such as conventional ice cream cone containers or other suitable dough which is sufficiently hard and impervious to liquid to receive a body 53 of a syrup or topping material and maintain the latter out of contact with the body of ice cream 51. Such a package is prepared by first filling the cardboard container 50 with ice cream or other frozen dessert in a softened state, then inserting the edible receptacle 52 forcing it downwardly centrally of the ice cream body until it occupies a position approximately as shown in FIG. 12, then filling the receptacle 52 with chocolate syrup or other syrup or topping material 53. The cover 54 is then placed on the container 50 and the confection package placed in a freezer compartment where it is maintained in a hard frozen state until ready to be served. When serving it is desirable to heat and soften or liquidify the syrup or topping material 53 within the receptacle 52 without unduly softening the body of ice cream and this is accomplished by placing an electrically conductive shield in such position in relation to the ice cream as to prevent access thereto to the high frequency heat. This is accomplished by placing the frozen confection package within cup 55 of metal or other electrically conducting material having a central opening 56 in its bottom and placing over the cup 55 a cover 57 of metal or other electrically conducting material having a central opening 58 arranged oppositely above the opening 56 in the bottom of the cup. The metal cup with the frozen confection package therein and metal cover 57 disposed thereover is then arranged on a suitable support 59 of glass, porcelain or other electrically insulating material within an electronic heating chamber, such as previously described and subjected to high frequency alternating current or electronic or dielectric heat. The heat thus generated enters through the openings 56 and 58 and penetrates the body of syrup or topping material 53 causing the latter to become quickly liquidified and heated while at the same time the metal cup 55 and cover 57 act as shields that prevent access of the electronic heat to the body of ice cream or other frozen dessert 51 and thus maintain the same at a satisfactorily hard frozen state until ready to serve. After subjecting the frozen food package to action of the electronic heat for several seconds, the metal cup 55 is removed from the electronic heating chamber, the cover 57 is removed from cup 55 and the confection package taken from cup 55. The cover 54 is removed and the dessert is ready to be served. Preferably with the syrup 53 within the receptacle 52 in a hot liquid state, the dessert is consumed by first dipping into the ice cream and then into the syrup taking a portion of the ice cream and syrup with each spoonful and when the ice cream and syrup are entirely consumed, the edible receptacle 52 with the syrup remaining therein can be eaten when receptacle 52 can be consumed along with the ice cream and syrup at the same time.

The complexities of U.S. Pat. No. 2,600,566 are not present in the food package of our invention wherein the quantity and rate of addition of the syrup 32 held on surface 28 is controllable as is the temperature of the syrup to be added to ice cream body 22.

Figure 13:
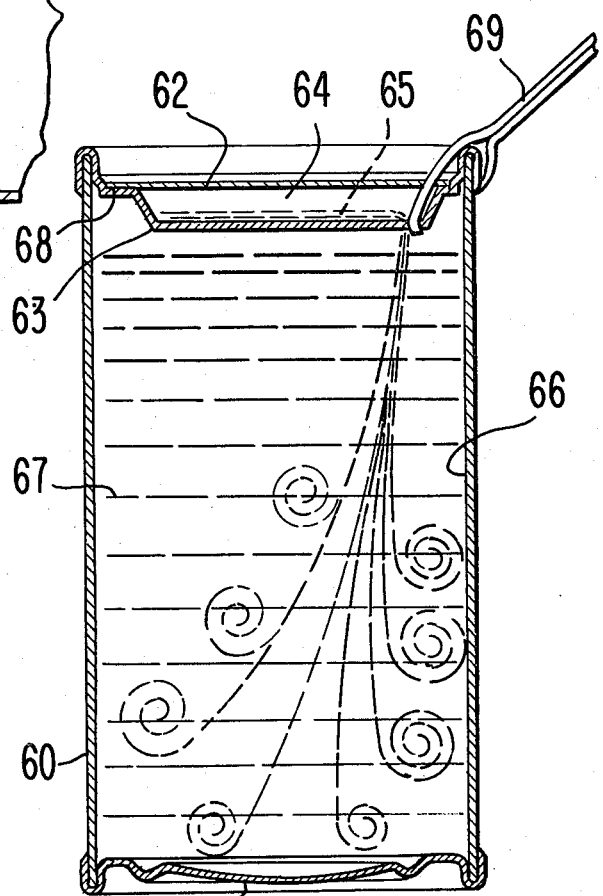
FIG. 13 is a sectional view in elevation of a beverage container embodying the invention of U.S. Pat. No. 3,305,368 issued on Feb. 21, 1967 illustrating the opening of the container and rupturing of a compartment wall therein with a common can opener.

FIG. 13 is a reproduction of FIG. 2 of U.S. Pat. No. 3,305,368 issued on Feb. 21, 1967. Therein illustrated is a compartmented beverage container having a cylindrical side wall 60, a bottom wall 61 and a top wall 62 having its peripheral portion rolled over or crimped and sealed to side wall 60 in accordance with conventional canning practices. A generally disc shaped compartment wall 63 underlies and is spaced adjacent to the top wall 62. The wall 63 divides the interior of the container into an upper compartment 64 there above having an acid-sensitive syrup 65 therein and a lower compartment 66 there below having carbonated water 67 therein. The compartment wall 63 is bonded about its periphery to the inner surface of the top wall 62 by any suitable means, such as adhesive 68 to provide a substantially gas and moisture impermeable seal around the syrup 65. In this manner, the syrup 65 is isolated from the carbonated water 67 and the carbon dioxide which may be released therefrom to enable the container to be stored for extended periods without curdling or other reaction or detrimental effects in the syrup 65. The transverse portion of the compartment wall 63 is in sufficiently close proximity to the top wall 62 as to be within reach of the blade 68 of a common can opener 69 during puncturing of the top wall 62. As the blade 68 ruptures the compartment wall 63, the syrup 65 flows into the carbonated water 67 causing turbulence and mixing of the components. Further turbulence resulting from the pouring of the mixed beverage from the container completes the mixing and provides a substantially homogeneous carbonated beverage formed with an acid-sensitive syrup. The concept set forth in FIG. 2 of U.S. Pat. No. 3,305,368 is different in kind from the concept of the ice cream package of our invention which contains controllably releaseable syrup onto frozen ice cream which syrup is heated in a quick and efficient fashion using discrete or continuous microwave oven operation. Until ready for consumption of the contents thereof, the food package of our invention need not be opened to the atmosphere or to the contaminating environment after sealing thereof by the manufacturer.

Figure 14:
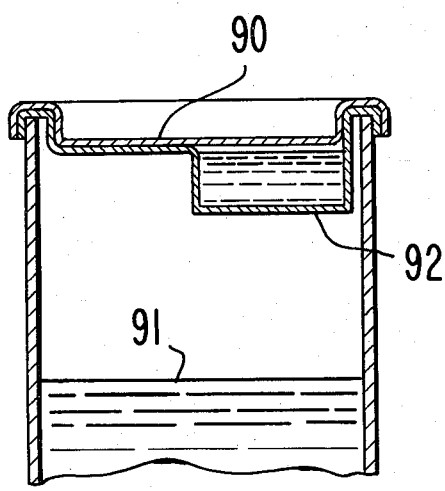
FIG. 14 is the sectional view of one embodiment of the invention of U.S. Pat. No. 3,743,520 issued on July 3, 1973 wherein a beverage container includes a plurality of compartment sections underlying a portion of the top of a compartmented beverage container.

FIG. 14 is a duplication of FIG. 1(b) of U.S. Pat. No. 3,743,520 issued on July 3, 1973. A standard metal beverage container is shown to include along with a bottom, side walls and a top wall. A compartment with beverage modifying ingredients to be positioned in the container includes a bottom wall portion, a side wall portion and a top wall portion. During assembly and sealing of the compartment in the container, the side wall portion, top wall portion and container top wall are all crimped over the side wall of the basic beverage container. The compartment for the modifying ingredients can be constructed using any suitable plastic or metallic material which is moisture impermeable and which can be ruptured with any suitable can opening implement. Suitable markings on the top delineate the location of the underlying compartment which underlies only a portion of the top. A second portion 90 has no underlying compartment and therefore provides direct access to the basic beverage within the container. Thus the basic beverage within the can is to be consumed without modification and access can be had to the beverage by rupturing the top only at the portion 90. In the construction shown in FIG. 14, the bottom wall portion of underlying compartment is sufficiently close to the top wall as to be ruptured when an ordinary can opener is used to puncture the top wall. Thus, by selective rupturing, the top, access can be had to the basic beverage 91 at top portion 90 and one or more modifying ingredients contained in section 92 can be mixed within the container to provide, for example, a cooler drink with chilly flavoring. The complexities of FIG. 14 of U.S. Pat. No. 3,743,520 are unlike the efficient simplified food package of the instant invention. Furthermore, the food package of U.S. Pat. No. 3,743,520 cannot be applied to the use of a two-compartment syrup/ice cream package as is the case in the instant invention.

What is claimed is:

1. A food package comprising a container having two compartments arranged vertically, a first lower compartment and a second upper compartment slidably and snugly and fixedly fitting into the upper portion of the first lower compartment, said first lower compartment having first totally enclosing substantially vertically juxtaposed side walls and a substantially flat bottom portion around the outer edge of which said side walls are connected, and frozen ice cream resting on said bottom portion, said first side walls having an upper edge, and resting firmly on said upper edge and snugly and fixedly fitting against the inner portion of said side walls, said second upper compartment comprising second side walls and a substantially flat bottom being in a plane substantially parallel to the bottom portion of said first lower compartment and spaced from the ice cream therebelow, said second side walls being of such dimensions as to fit snugly and fixedly against the inner portion of said first side walls of said first compartment, said bottom of said second upper compartment being constructed of a microwave-resistant metal foil material and located on the upper surface of said bottom of said second upper compartment, a frozen syrup composition, said bottom of said second upper compartment being manually puncturable; and covering said second compartment, and supported on the upper edge of said second side walls, a microwave-permeable transparent lid having a diameter minutely greater than the outer diameter of said second upper compartment, said transparent lid being substantially totally permeable to the passage of microwave energy, the dimensions of said first compartment and of said second compartment being such that conveniently consumable portions of syrup and ice cream are contained within said compartments, the volume of said ice cream being less than the internal volume of said first compartment, so that when microwave energy is generated from a location directly above said food package and in a direction substantially perpendicular to the metal foil microwave-resistant bottom of said second upper compartment, said frozen syrup melts and becomes fluid, and of such a low viscosity that it will flow as a result of the force of gravity either: (i) through a manually created orifice in said metal foil microwave-resistant bottom or (ii) by means of manually pouring the syrup from said second upper compartment into said first lower compartment.

2. A process for utilizing the food package of claim 1 comprising the steps of placing said food package containing frozen ice cream in the first lower compartment thereof and frozen syrup in the second upper compartment thereof into a microwave oven and generating microwave energy from a location directly above said food package and in a direction substantially perpendicular to the bottom portion of said second upper compartment until the syrup located on the surface of said second upper compartment is in a melted state, while maintaining the ice cream body in said first lower compartment in a frozen or refrigerated state; then creating an orifice in the bottom portion of said second upper compartment so that said syrup flows in a controllable manner onto the surface of said ice cream body; then separating said first lower compartment from said second upper compartment in order to facilitate consumption of the resultant food body which consists essentially of molten syrup and frozen ice cream.

3. The food package of claim 1 wherein the second upper compartment has an integral part of said second side walls an extended handle means for ease of handling said second upper compartment so that subsequent to its physical transformation from a frozen state into a molten state, the syrup may be poured at a controllable rate and in a controllable quantity onto the ice cream body located in said first lower compartment.

4. The process of utilizing the food package of claim 3 comprising the step of placing said food package containing frozen ice cream in the first lower compartment thereof and frozen syrup in the second upper compartment thereof, in a microwave oven and causing microwave energy to be directed from a location directly above said food package in a direction substantially perpendicular to the bottom surface of said upper compartment until said syrup located on the surface of said second upper compartment is in a molten flowable state; then removing said second upper compartment from said first lower compartment and pouring, in a controllable manner, over a given period of time and at a given rate, the syrup located in said second compartment onto the frozen ice cream located in said first compartment whereby a syrup-ice cream confection ready for eating is produced.

5. The food package of claim 3 wherein its geometry is in the form of a frustum of a cone with the upper edge thereof having a diameter larger than the lower edge thereof.

6. The food package of claim 1 wherein its geometry is in the form of a frustum of a cone with the upper edge thereof having a diameter larger than the lower edge thereof.

7. A food package comprising a container having two compartments, a first lower compartment and a second upper compartment arranged vertically one above the other comprising enclosing substantially vertically juxtaposed side walls and a substantially flat bottom portion around the outer edge of which flat bottom portion said side walls are connected in a continuous manner, frozen ice cream resting on said flat bottom portion, a substantially circular upper rim and fixedly and detachably resting on said upper rim in a microwave permeable transparent lid having a diameter minutely greater than the outer diameter of said upper rim and intermediate said upper rim and said bottom portion, a thin disc being in a plane substantially parallel to the plane of said bottom portion and spaced from the ice cream therebelow, said thin disc being manually puncturable and constructed of a microwave resistant metal foil material, and said thin disc having a rim which is adhered in a continuous manner and adjacent to said side walls; and resting on said thin disc, frozen syrup; said thin disc and said bottom portion defining the upper and lower boundaries of said first lower compartment and said thin disc and said lid defining, respectively, the lower and upper boundaries of said second upper compartment; the dimensions of said first compartment and of said second compartment being such that conveniently consumable portions of syrup and ice cream are contained within said compartments, the volume of said ice cream being less than the internal volume of said first compartment, so that when microwave energy is generated from a location directly above said food package in a direction substantially perpendicular to the metal foil microwave-resistant bottom portion of said upper compartment, said frozen syrup melts and becomes fluid, and of such a low viscosity that it will flow as a result of the force of gravity either: (i) through a manually created orifice in said metal foil microwave-resistant bottom or (ii) by means of manually pouring the syrup from said second upper compartment into said first lower compartment.

8. A process for utilizing the food package of claim 7 comprising the steps of placing said food package containing frozen ice cream in the first lower compartment thereof and frozen syrup in the second upper compartment thereof, into a microwave oven and generating microwave energy from a location directly above said food package and in a direction substantially perpendicular to the bottom portion of said second upper compartment, until the syrup located on the surface of said second compartment is in a melted state, while maintaining the ice cream body in said first lower compartment in a frozen or refrigerated state; then creating an orifice in the bottom portion of said second upper compartment whereby said syrup flows in a controllable manner onto the surface of said ice cream body.

9. The food package of claim 7 wherein its geometry is in the form of a frustum of a cone with the upper edge thereof having a diameter larger than the lower edge thereof.

* * * * *